United States Patent
Ko et al.

(10) Patent No.: US 10,098,107 B2
(45) Date of Patent: Oct. 9, 2018

(54) METHOD AND APPARATUS FOR TRANSCEIVING CONTROL INFORMATION IN A WIRELESS COMMUNICATION SYSTEM

(71) Applicant: LG ELECTRONICS INC., Seoul (KR)

(72) Inventors: Hyunsoo Ko, Anyang-si (KR); Kitae Kim, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/377,969

(22) Filed: Dec. 13, 2016

(65) Prior Publication Data

US 2017/0094647 A1    Mar. 30, 2017

Related U.S. Application Data

(63) Continuation of application No. 14/350,769, filed as application No. PCT/KR2012/008199 on Oct. 10, 2012, now Pat. No. 9,554,368.

(60) Provisional application No. 61/545,552, filed on Oct. 10, 2011.

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01); *H04W 72/044* (2013.01)

(58) Field of Classification Search
CPC ... H04L 1/0031; H04L 1/1896; H04L 5/0048; H04W 72/0406
See application file for complete search history.

(56) References Cited

U.S. PATENT DOCUMENTS

| | | | |
|---|---|---|---|
| 9,084,238 B2 * | 7/2015 | Gao | H04L 5/0016 |
| 2007/0183306 A1 * | 8/2007 | Akita | H04J 11/0073 370/208 |
| 2009/0088148 A1 | 4/2009 | Chung et al. | |

(Continued)

FOREIGN PATENT DOCUMENTS

| | | |
|---|---|---|
| KR | 10-2010-0118952 | 11/2010 |
| KR | 10-2011-0069834 | 6/2011 |

(Continued)

OTHER PUBLICATIONS

PCT International Application No. PCT/KR2012/008199, Written Opinion of the International Searching Authority dated Mar. 20, 2013, 18 pages.

*Primary Examiner* — Edan Orgad
*Assistant Examiner* — Nourali Mansoury
(74) *Attorney, Agent, or Firm* — Lee, Hong, Degerman, Kang & Waimey

(57) ABSTRACT

An embodiment of the present invention relates to a method in which a terminal receives control information in a wireless communication system, said method comprising: a step of performing blind decoding in at least one portion of a resource region except the time unit indicated by a physical control format indicator channel (PCFICH) on a subframe, said at least one portion of the resource region is determined by whether a synchronizing signal or system information is transmitted or not.

8 Claims, 15 Drawing Sheets

(a)

(b)

(56) References Cited

U.S. PATENT DOCUMENTS

| | | | |
|---|---|---|---|
| 2010/0182903 A1* | 7/2010 | Palanki | H04L 1/0041 370/225 |
| 2010/0255834 A1* | 10/2010 | Ishii | H04W 36/0094 455/424 |
| 2011/0122825 A1 | 5/2011 | Lee et al. | |
| 2011/0261772 A1* | 10/2011 | Iwamura | H04W 28/20 370/329 |
| 2011/0268101 A1 | 11/2011 | Wang et al. | |
| 2011/0312319 A1 | 12/2011 | Lindoff et al. | |
| 2013/0039284 A1* | 2/2013 | Marinier | H04L 5/001 370/329 |
| 2013/0044692 A1* | 2/2013 | Nory | H04L 5/0048 370/329 |
| 2013/0088972 A1* | 4/2013 | Kim | H04L 5/001 370/241 |
| 2013/0142111 A1* | 6/2013 | Kim | H04W 76/046 370/315 |
| 2013/0208686 A1* | 8/2013 | Zhang | H04J 11/0056 370/329 |
| 2013/0250906 A1 | 9/2013 | Golitschek Edler Von Elbwart et al. | |
| 2014/0092792 A1* | 4/2014 | Kim | H04L 5/0007 370/280 |
| 2014/0226761 A1* | 8/2014 | Nory | H04L 5/0048 375/340 |
| 2014/0334416 A1 | 11/2014 | Ko et al. | |
| 2017/0156132 A1* | 6/2017 | Blankenship | H04L 5/001 |

FOREIGN PATENT DOCUMENTS

| | | |
|---|---|---|
| KR | 10-2011-0087285 | 8/2011 |
| KR | 10-2011-0089191 | 8/2011 |

\* cited by examiner

FIG. 15
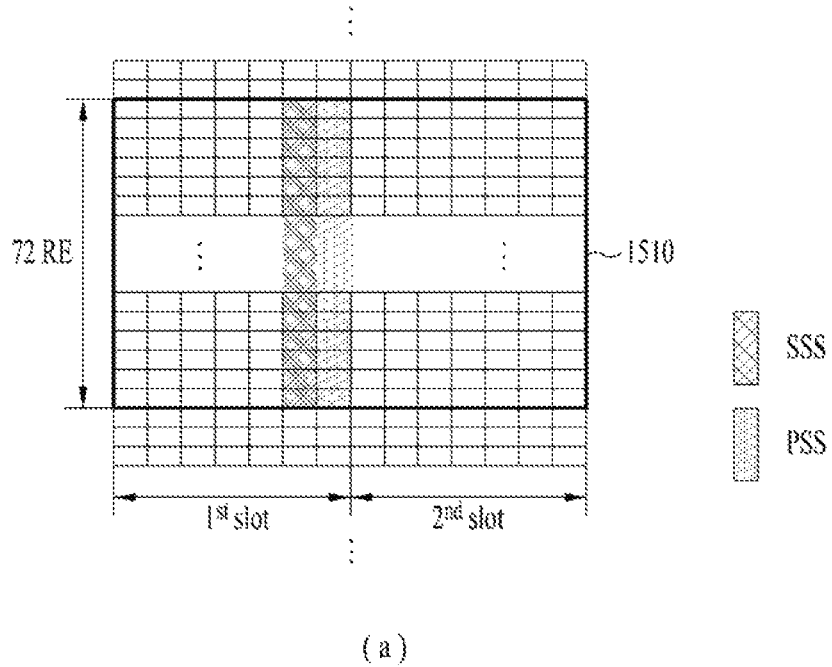
(a)
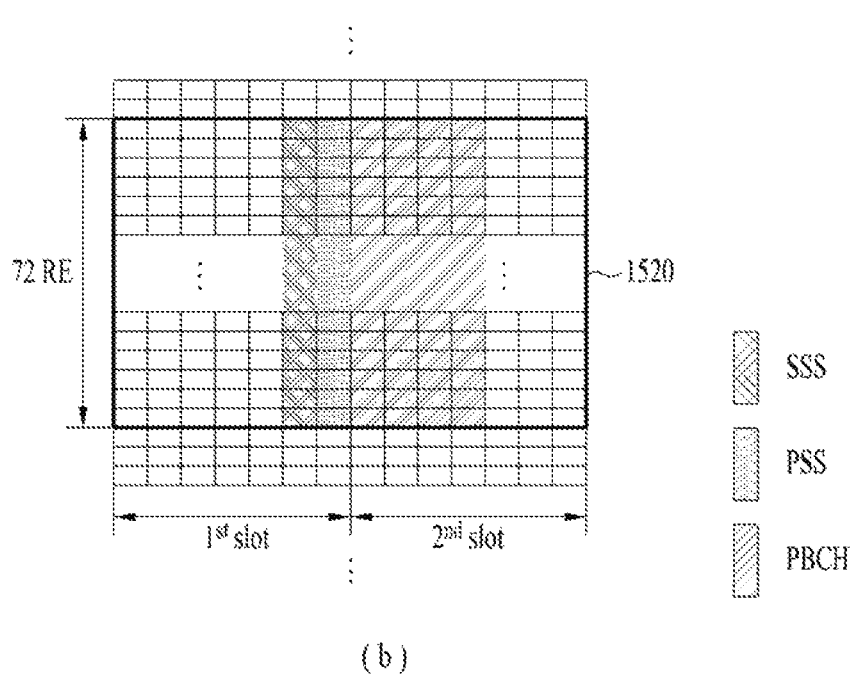
(b)

FIG. 16
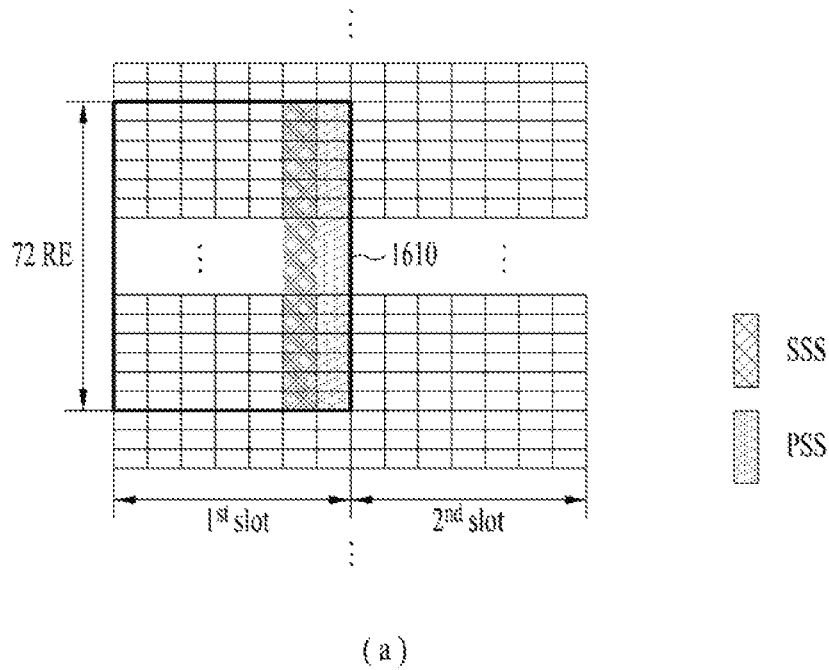
(a)
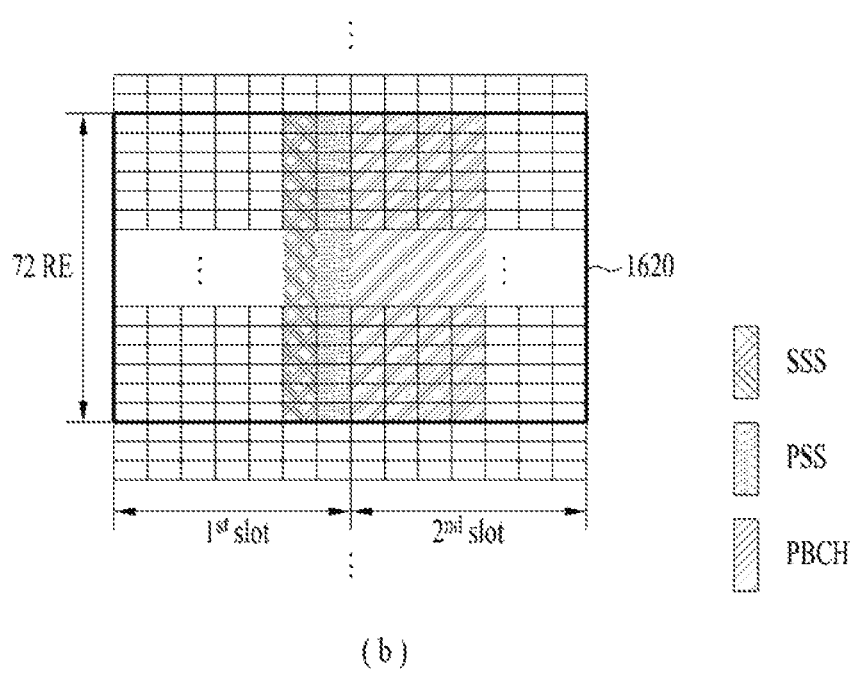
(b)

METHOD AND APPARATUS FOR TRANSCEIVING CONTROL INFORMATION IN A WIRELESS COMMUNICATION SYSTEM

CROSS-REFERENCE TO RELATED APPLICATIONS

This application is a continuation of U.S. patent application Ser. No. 14/350,769, filed on Apr. 9, 2014, now U.S. Pat. No. 9,554,368, which is the National Stage filing under 35 U.S.C. 371 of International Application No. PCT/KR2012/008199, filed on Oct. 10, 2012, which claims the benefit of U.S. Provisional Application No. 61/545,552, filed on Oct. 10, 2011, the contents of which are all hereby incorporated by reference herein in their entirety.

TECHNICAL FIELD

The present invention relates to a method and apparatus for transceiving control information in a wireless communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method and apparatus for transceiving control information, and more particularly to the relationship between e-PDCCH and a resource region to which system information is transmitted during e-PDCCH transmission.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving control information of a user equipment (UE) in a wireless communication system including: performing blind decoding for the control information in a part of a resource region other than a time unit indicated by a physical control format indicator channel (PCFICH) on a subframe, wherein the a part of the resource region is decided according to whether or not a synchronous signal or system information is transmitted.

In a second technical aspect of the present invention, a method for transmitting control information of a base station (BS) in a wireless communication system includes: transmitting downlink control information in a part of a resource region other than a time unit indicated by a physical control format indicator channel (PCFICH) on a subframe, wherein the a part of the resource region is decided according to whether or not a synchronous signal or system information is transmitted.

In a third technical aspect of the present invention, a user equipment (UE) device for use in a wireless communication system includes: a transmission (Tx) module; and a processor, wherein the processor performs blind decoding for the control information in the part of a resource region other than a time unit indicated by a physical control format indicator channel (PCFICH) on a subframe, wherein the the part of the resource region is decided according to whether or not a synchronous signal or system information is transmitted.

In a fourth technical aspect of the present invention, a base station (BS) device for use in a wireless communication system includes: a reception (Rx) module; and a processor, wherein the processor transmits downlink control information in the part of a resource region other than a time unit indicated by a physical control format indicator channel (PCFICH) on a subframe, wherein the the part of the resource region is decided according to whether or not a synchronous signal or system information is transmitted.

The first to fourth technical aspects may include all or some parts of the following items.

If the subframe may be used as a specific subframe to which at least one of the synchronous signal and the system information is transmitted, a frequency domain to which the synchronous signal or the system information is transmitted is not contained in the part of the resource region.

The synchronous signal may include a primary synchronous signal and a secondary synchronous signal, and the system information may be transmitted on a physical broadcast channel (PBCH).

The frequency domain may correspond to 6 resource blocks (6 RBs) located at a center part of an entire frequency bandwidth.

A resource region to which a reference signal is transmitted may not be contained in the part of the resource region. The reference signal (RS) may be any one of a cell-specific reference signal (RS) or channel status information reference signal (CSI-RS).

Advantageous Effects

As is apparent from the above description, the embodiments of the present invention can prevent the occurrence of collision between e-PDCCH and a specific region to which system information is transmitted.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 15 and 16 are conceptual diagrams illustrating an e-PDCCH allocation method and UE operations according to one embodiment of the present invention.

BEST MODE

Figure 1:
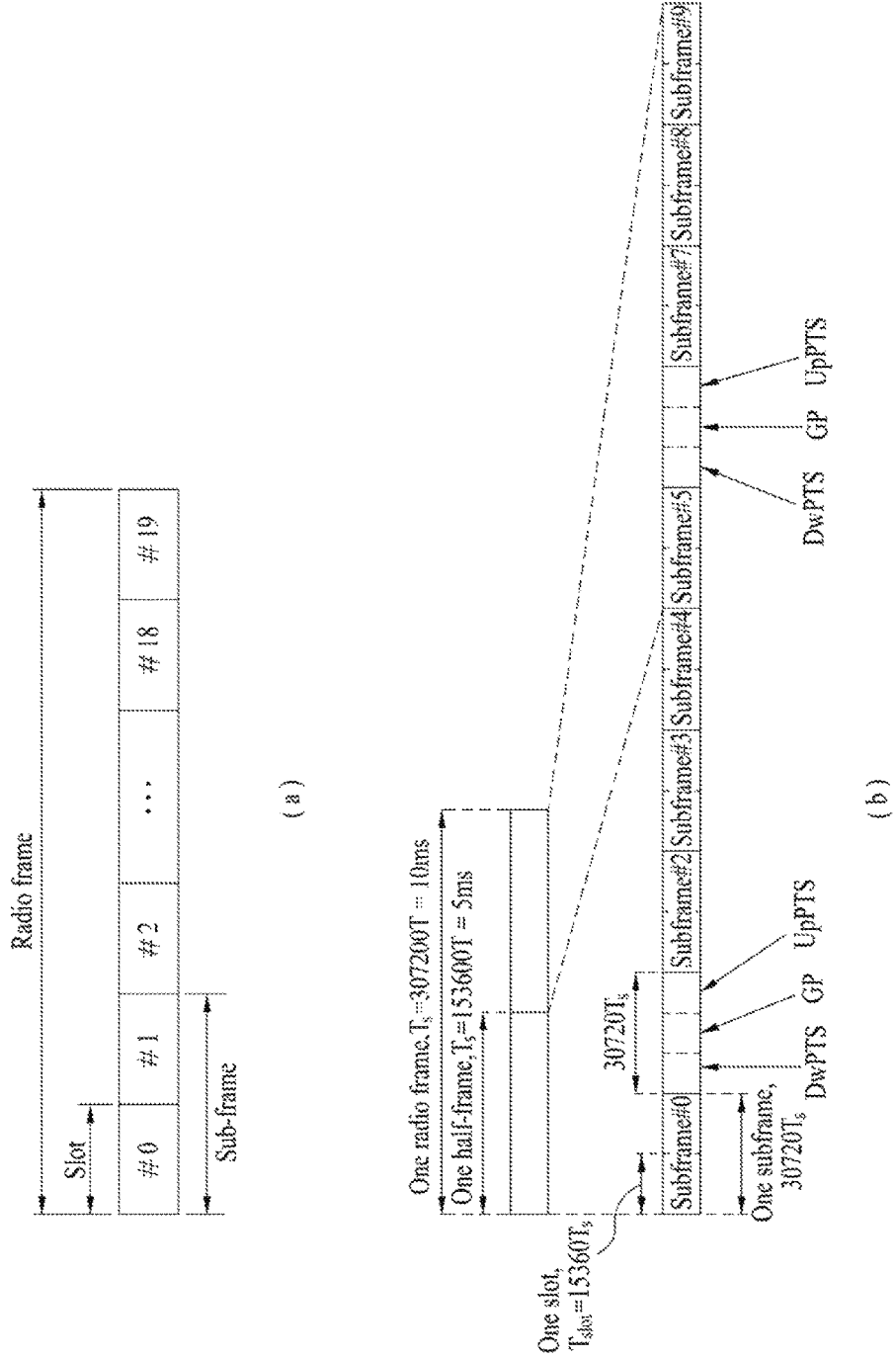
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 exemplarily shows a radio frame structure for use in the LTE system. Referring to FIG. 1(a), a radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in time domain. Since the LTE system uses OFDMA in downlink, the OFDM symbol indicates one symbol duration. One OFDM symbol may be called an SC-FDMA symbol or a symbol duration. An RB is a resource allocation unit and includes a plurality of contiguous subcarriers in one slot. The structure of the radio frame is only exemplary. Accordingly, the number of subframes included in one radio frame, the number of slots included in one subframe, or the number of OFDM symbols included in one slot may be changed in various manners.

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal.

The structure of the radio frame is only exemplary. Accordingly, the number of subframes included in the radio frame, the number of slots included in the subframe or the number of symbols included in the slot may be changed in various manners.

Figure 2:
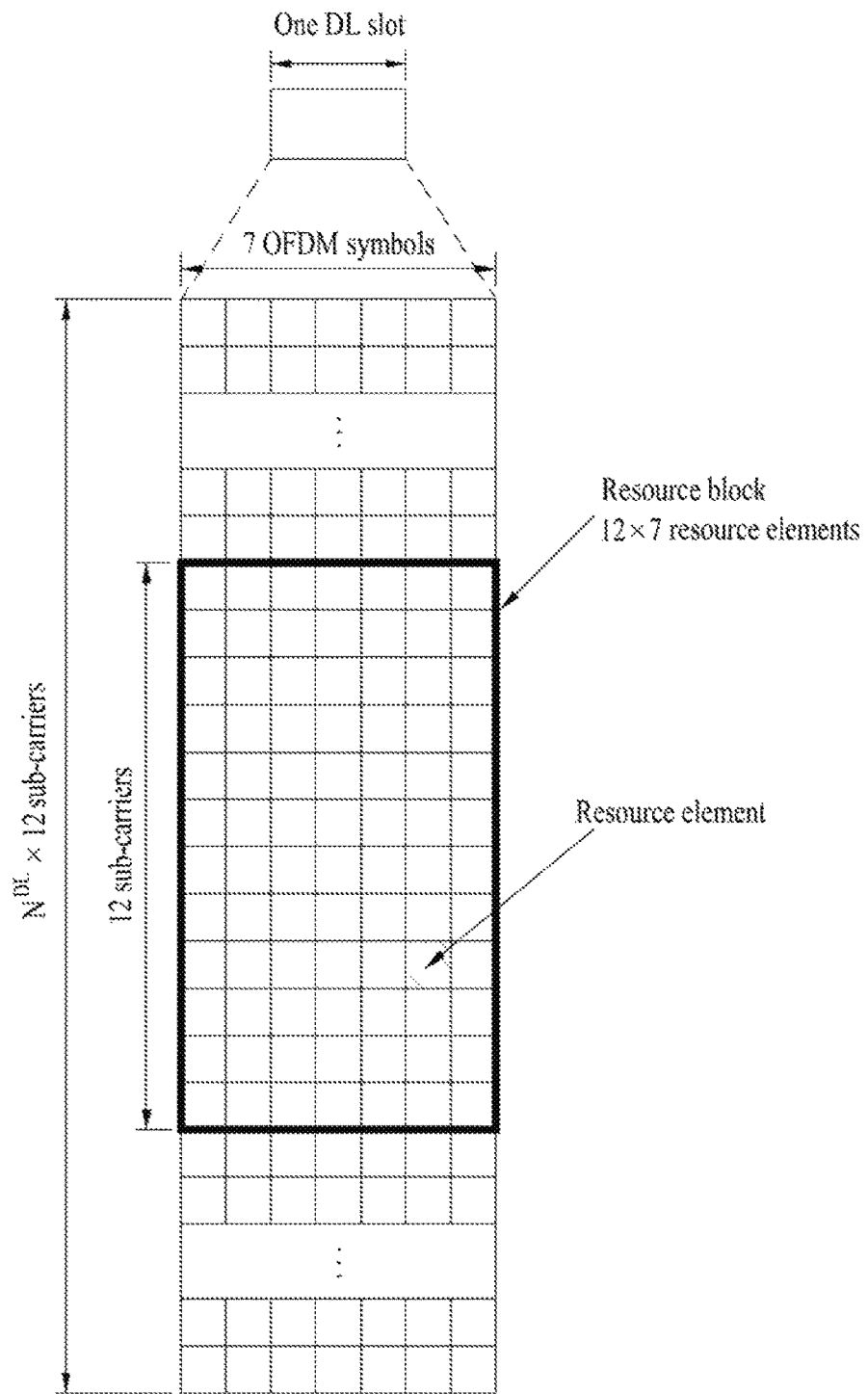
FIG. 2 exemplarily shows a resource grid of one downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
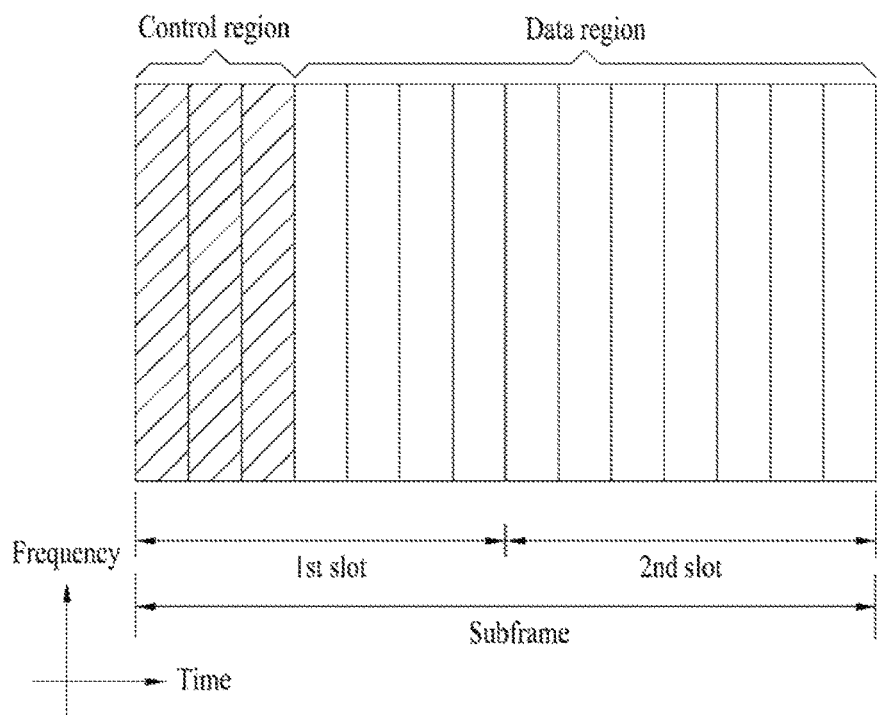
FIG. 3 exemplarily shows a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc.

PCFICH is transmitted at a first OFDM symbol of a subframe, and includes information about the number of OFDM symbols used to transmit the control channel in the subframe.

PHICH includes a HARQ ACK/NACK signal as a response to uplink transmission.

The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. PDCCHs are transmitted as an aggregate of one or several contiguous control channel elements (CCEs). The CCE is a logical allocation unit used to provide the PDCCHs at a coding rate based on the state of a radio channel The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
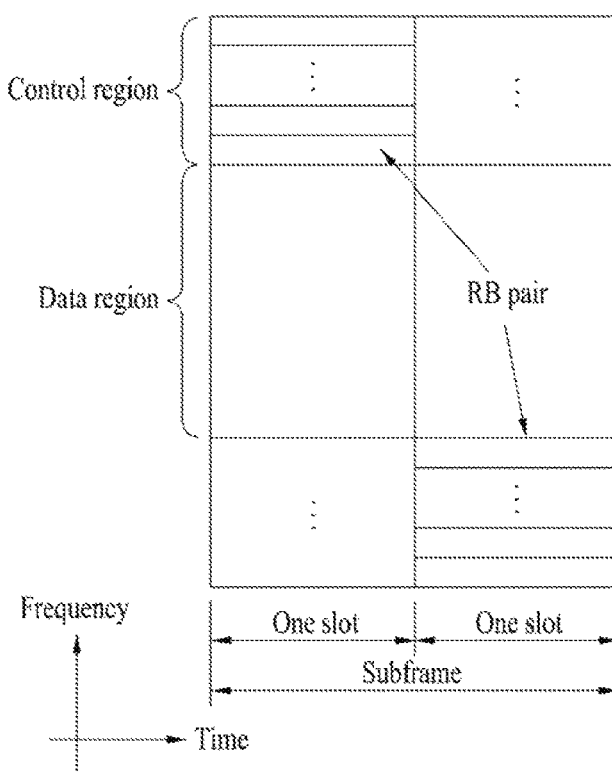
FIG. 4 exemplarily shows an uplink subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

DCI Format

DCI formats 0, 1, 1A, 1B, 1C, 1D, 2, 2A, 2B, 2C, 3, 3A and 4 are defined in LTE-A (release 10). DCI formats 0, 1A, 3 and 3A have the same message size to reduce the number of blind decoding operations, which will be described later. The DCI formats may be divided into i) DCI formats 0 and 4 used for uplink scheduling grant, ii) DCI formats 1, 1A, 1B, 1C, 2, 2A, 2B and 2C used for downlink scheduling allocation, and iii) DCI formats 3 and 3A for power control commands according to purpose of control information to be transmitted.

DCI format 0 used for uplink scheduling grant may include a carrier indicator necessary for carrier aggregation which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission with respect to an HARQ process, a transmit power control (TPC) command for a scheduled PUSCH, information on a cyclic shift for a demodulation reference signal (DMRS) and OCC index, and an uplink index and channel quality indicator request necessary for a TDD operation, etc. DCI format 0 does not include a redundancy version, differently from DCI formats relating to downlink scheduling allocation, because DCI format 0 uses synchronous HARQ. The carrier offset is not included in DCI formats when cross-carrier scheduling is not used.

DCI format 4 is newly added to DCI formats in LTE-A release 10 and supports application of spatial multiplexing to uplink transmission in LTE-A. DCI format 4 has a larger message size because it further includes information for spatial multiplexing. DCI format 4 includes additional control information in addition to control information included in DCI format 0. DCI format 4 includes information on a modulation and coding scheme for the second transmission block, precoding information for multi-antenna transmission, and sounding reference signal (SRS) request information. DCI format 4 does not include the offset for format 0/format 1A differentiation because it has a size larger than DCI format 0.

DCI formats 1, 1A, 1B, 1C, 1D, 2, 2A, 2B and 2C for downlink scheduling allocation may be divided into DCI formats 1, 1A, 1B, 1C and 1D that do not support spatial multiplexing and DCI formats 2, 2A, 2B and 2C that support spatial multiplexing.

DCI format 1C supports only frequency contiguous allocation as compact frequency allocation and does not include the carrier indicator and redundancy version, compared to other formats.

DCI format 1A is for downlink scheduling and random access procedure. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission with respect to a HARQ process, a TPC command for a PUCCH, an uplink index necessary for a TDD operation, etc.

DCI format 1 includes control information similar to that of DCI format 1A. DCI format 1 supports non-contiguous resource allocation whereas DCI format 1A supports contiguous resource allocation. Accordingly, DCI format 1 further includes a resource allocation header, and thus slightly increases control signaling overhead as a trade-off for an increase in resource allocation flexibility.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C may be regarded as an extended version of DCI format 2B and supports spatial multiplexing for up to 8 layers.

DCI formats 3 and 3A may be used to complement the TPC information included in the aforementioned DCI formats for uplink scheduling grant and downlink scheduling allocation, that is, to support semi-persistent scheduling. A 1-bit command is used per UE in the case of DCI format 3 whereas a 2-bit command is used per UE in the case of DCI format 3A.

One of the above-mentioned DCI formats is transmitted through a PDCCH, and a plurality of PDCCHs may be transmitted in a control region. A UE can monitor the plurality of PDCCHs.

Downlink Control Channel Structure

The first three OFDM symbols for each subframe can be basically used as a transmission region of a downlink control channel, and the first to third OFDM symbols may be used according to overhead of a downlink control channel. PCFICH may be used to adjust the number of OFDM symbols for a downlink control channel per subframe. In order to provide acknowledgement/negative acknowledgment (ACK/NACK) information for uplink transmission on downlink, a Physical Hybrid-automatic repeat request (ARQ) Indicator Channel (PHICH) may be used. In addition, a PDCCH may be used to transmit either control information for downlink data transmission or control information for uplink data transmission.

Figure 5:
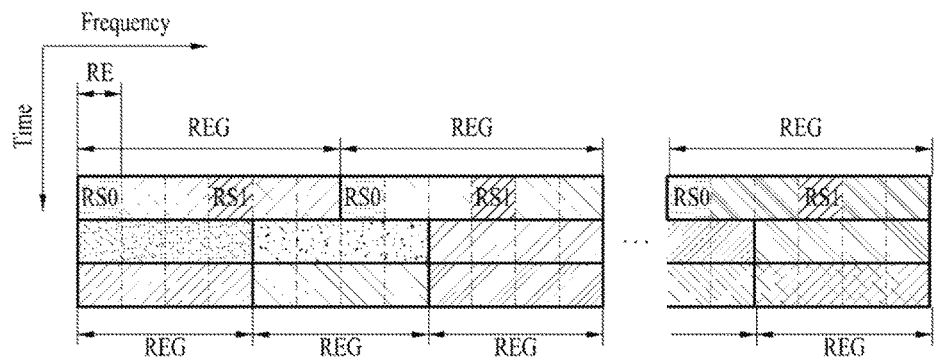
FIGS. 5 and 6 illustrate a resource element group (REG) serving as an allocation unit of downlink control channels.
Figure 6:
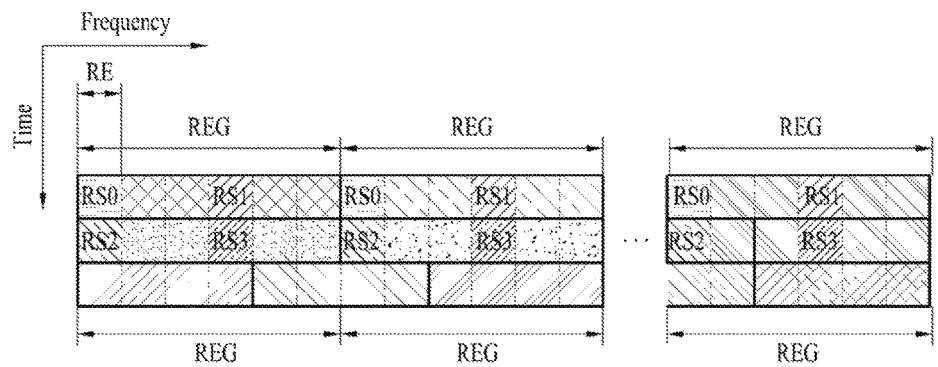

FIGS. 5 and 6 exemplarily show that the above-mentioned downlink control channels are allocated in units of a resource element group (REG) in a control region for each subframe. In more detail, FIG. 5 shows a system having 1Tx antenna or 2Tx antennas, and FIG. 6 shows a system having 4Tx antennas. As can be seen from FIGS. 5 and 6, an REG serving as a basic resource unit to which a control channel is allocated is composed of 4 concatenated resource elements (REs) in a frequency domain other than some REs to which reference signals are allocated. A predetermined number of REGs may be used to transmit a downlink control channel according to downlink control channel (DCH) overhead.

PCFICH (Physical Control Format Indicator Channel)

In order to provide resource allocation information or the like of the corresponding subframe to each subframe, a PDCCH may be transmitted among OFDM symbol indices #0 to #2. In accordance with overhead of a control channel, an OFDM symbol index #0 may be used, OFDM symbol indices #0 and #1 may be used, or OFDM symbol indices #0 to #2 may be used. The number of OFDM symbols used by a control channel may be changed per subframe, and information regarding the number of OFDM symbols may be provided over a PCFICH. Therefore, PCFICH must be transmitted per subframe.

Three kinds of information can be provided through a PCFICH. The following Table 1 shows a Control Format Indicator of a PCFICH. CFI=1 denotes that a PDCCH is transmitted at OFDM symbol index #0, CFI=2 denotes that a PDCCH is transmitted at OFDM symbol indices #0 and #1, and CFI=3 denotes that a PDCCH is transmitted at OFDM symbol indices #0 to #2.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information transmitted over a PCFICH may be differently defined according to system bandwidth. For example, if a system bandwidth is less than a specific threshold value, CFI=1, CFI=2, and CFI=3 may indicate that two OFDM symbols, three OFDM symbols, and four OFDM symbols are used for a PDCCH, respectively.

Figure 7:
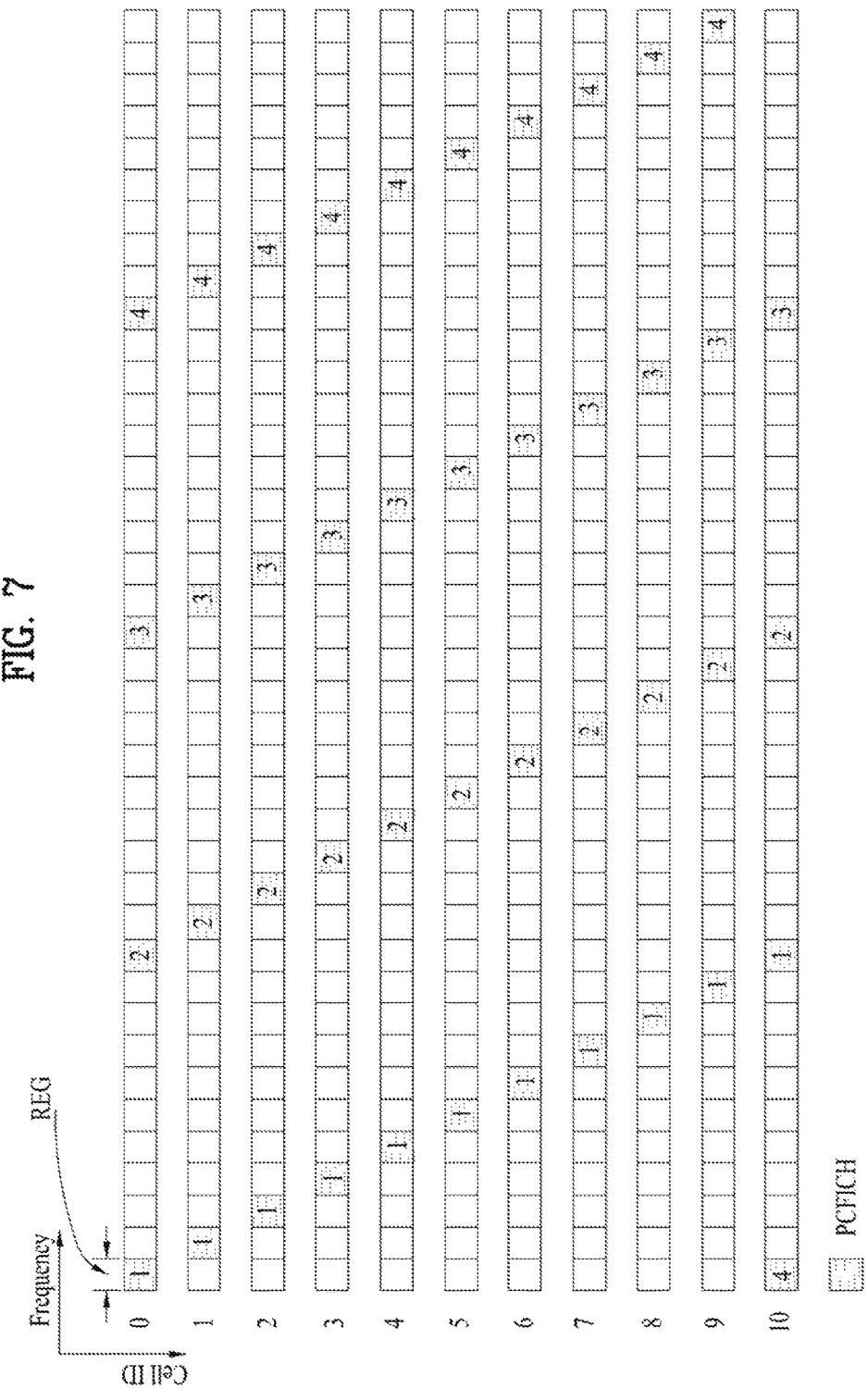
FIG. 7 is a conceptual diagram illustrating a Physical Control Format Indicator Channel (PCFICH) transmission scheme.

FIG. 7 is a conceptual diagram illustrating a PCFICH transmission scheme. An REG shown in FIG. 7 may be composed of 4 subcarriers, and may be composed only of data subcarriers other than a reference signal (RS). Generally, a transmit diversity scheme may be applied to the REG. To prevent inter-cell interference of the PCFICH, the REGs to which the PCFICH is mapped may be shifted per cell in the frequency domain (according to a cell ID). The PCFICH is transmitted at the first OFDM symbol of a subframe all the time. Accordingly, when receiving a subframe, the receiver first confirms PCFICH information, and recognizes the number of OFDM symbols needed for PDCCH transmission, such that it can receive control information transmitted over a PDCCH.

Physical Hybrid-ARQ Indicator Channel (PHICH)

Figure 8:
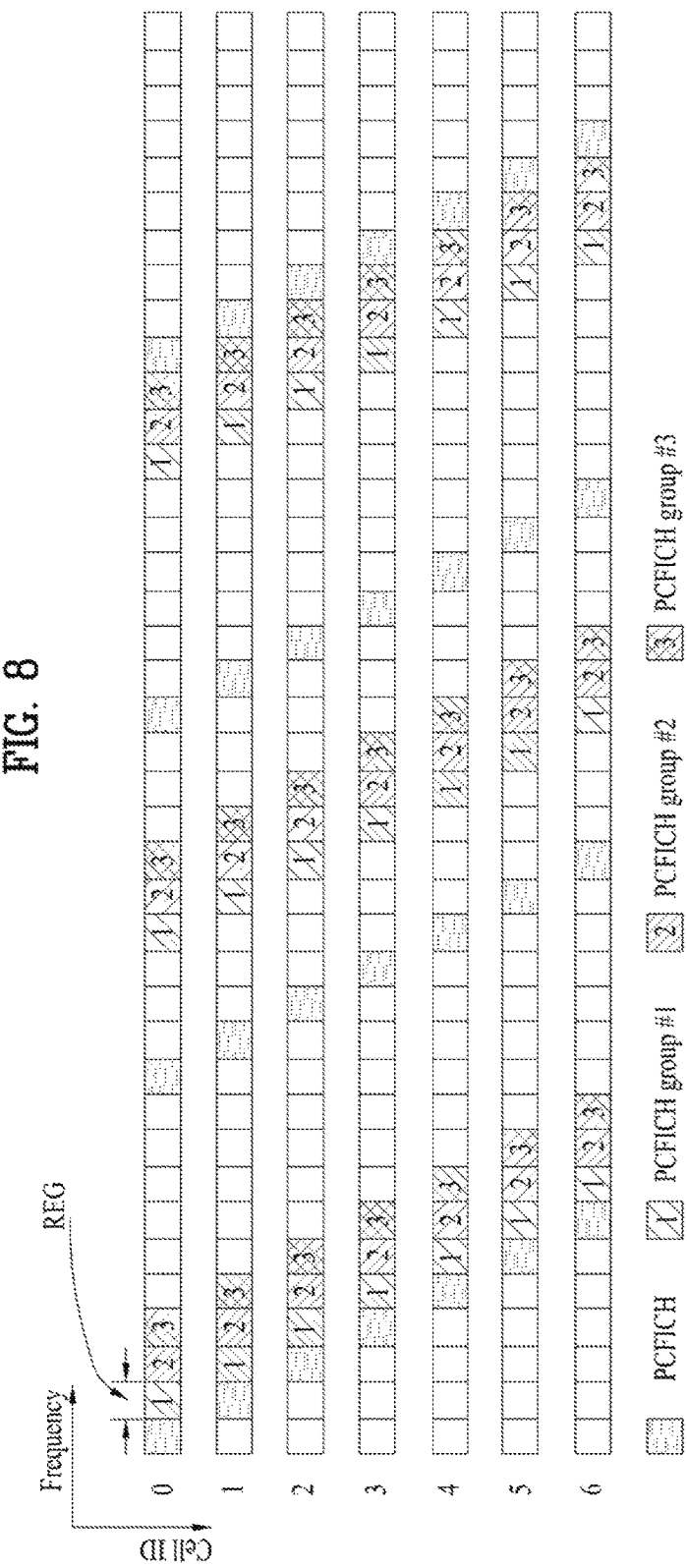
FIG. 8 shows the positions of a PCFICH and a Physical hybrid ARQ indicator Channel (PHICH).

FIG. 8 shows the positions of PCFICH and PHICH generally applied to a specific bandwidth. ACK/NACK information for uplink data transmission is transmitted over a PHICH. A plurality of PHICH groups is constructed in a single subframe, and a plurality of PHICHs may be present in a single PHICH group. Therefore, PHICH channels for multiple UEs are contained in a single PHICH group.

Referring to FIG. 8, allocating a PHICH to each UE of a plurality of PHICH groups is achieved not only using a lowest physical resource block (PRB) index of a PUSCH resource allocation but also a cyclic shift (CS) index for a demodulation RS (DMRS) transmitted on a UL grant PDCCH. DMRS is an uplink reference signal, and is provided along with UL transmission so as to perform channel estimation for demodulating UL data. In addition, a PHICH resource is signaled as an index pair such as $(n_{PHICH}^{group}, n_{PHICH}^{seq})$. In the index pair $(n_{PHICH}^{group}, n_{PHICH}^{seq})$, $n_{PHICH}^{group}$ denotes a PHICH group number and $n_{PHICH}^{seq}$ denotes an orthogonal sequence index in the corresponding PHICH group. $n_{PHICH}^{group}$ and $n_{PHICH}^{seq}$ are defined as shown in the following equation 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH}$$ [Equation 1]

In Equation 1, $n_{DMRS}$ denotes a cyclic shift of a DMRS used for uplink transmission related to a PHICH, and is mapped to a value of 'cycle shift for DMRS' field of the latest UL grant control information (e.g., DCI format 0 or 4) for a transport block (TB) associated with the corresponding PUSCH transmission. For example, the 'cyclic shift for DMRS' field of the latest UL grant DCI format may be 3 bits long. If the 'cyclic shift for DMRS' field is set to "000", $n_{DMRS}$ may be set to zero '0'.

In Equation 1, $N_{SF}^{PHICH}$ denotes the size of a spreading factor used for PHICH modulation. $I_{PRB\_RA}^{lowest\_index}$ is the lowest PRB index of a first slot of the corresponding PUSCH transmission. $I_{PHICH}$ is set to the value of 1 only when the TDD system is in a special case (if UL/DL configuration is set to zero '0' and PUSCH transmission is achieved at subframe n=4 or n=9, and $I_{PHICH}$ is set to zero '0' in the remaining cases other than the special case. $N_{PHICH}^{group}$ denotes the number of PHICH groups configured by a higher layer. $N_{PHICH}^{group}$ can be obtained using the following equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Equation 2]

In Equation 2, $N_g$ denotes information regarding the amount of PHICH resources transmitted on a physical broadcast channel (PBCH), and $N_g$ is 2 bits long and is denoted by $N_g \in \{1/6, 1/2, 1, 2\}$. In Equation 2, $N_{RB}^{DL}$ denotes the number of resource blocks (RBs) configured in downlink.

In addition, examples of orthogonal sequences defined in the legacy 3GPP LTE Release 8/9 are shown in the following table 2.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
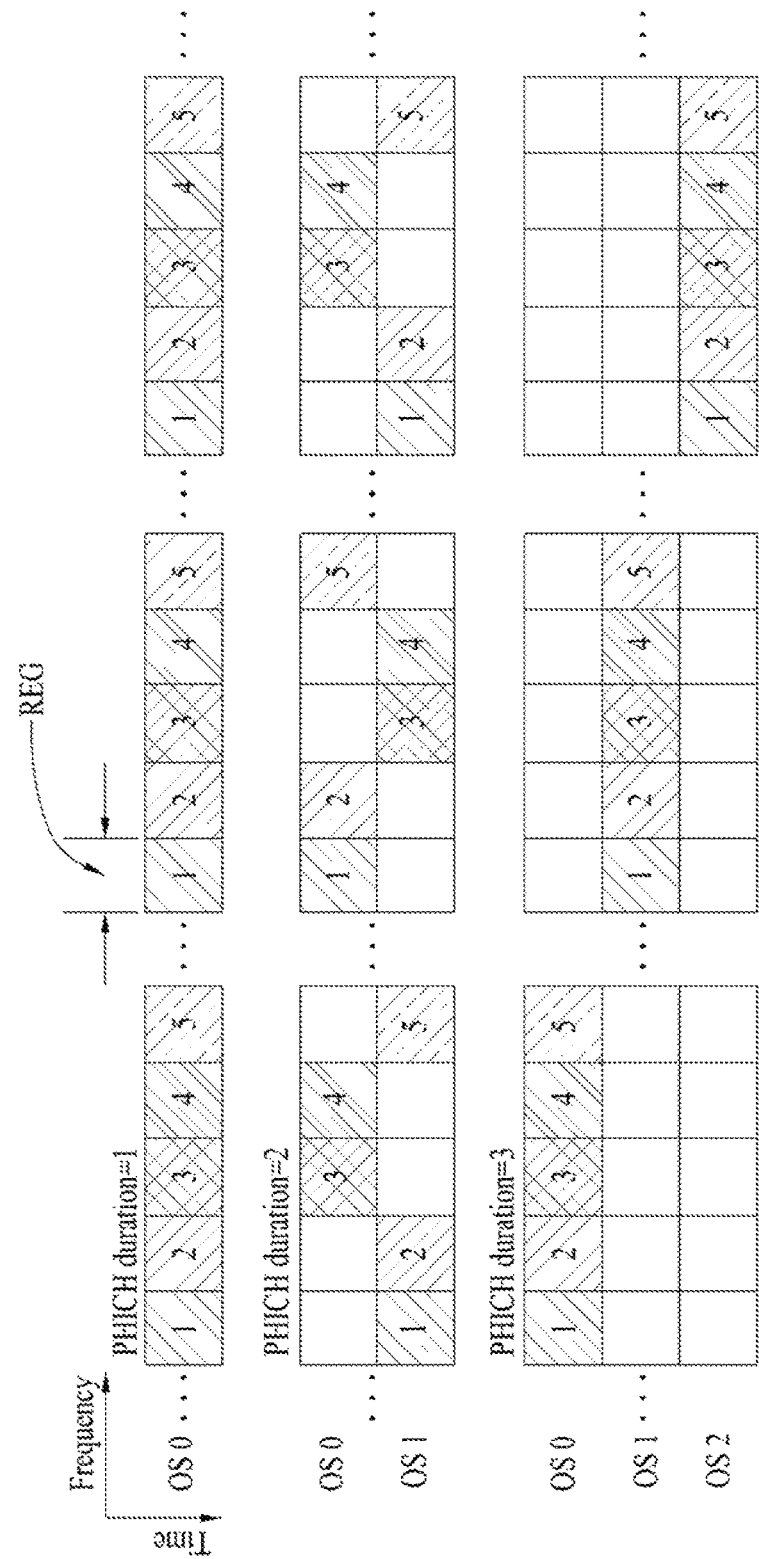
FIG. 9 shows a downlink resource element position mapped to a PHICH group.

FIG. 9 shows a downlink resource element position mapped to a PHICH group. A PHICH group may be constructed in different time domains (i.e., different OFDM Symbols (OSs)) of a single subframe shown in FIG. 9 according to a PHICH duration.

PDCCH Processing

When PDCCHs are mapped to REs, control channel elements (CCEs) corresponding to contiguous logical allocation units are used. A CCE includes a plurality of (e.g. 9) REGs and an REG includes 4 neighboring REs except for a reference signal (RS).

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 3.

TABLE 3

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 4.

TABLE 4

| | Search space | | The number of PDCCH |
| --- | --- | --- | --- |
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown Table 4, the UE has a plurality of search spaces at each aggregation level because 4 aggregation levels are present. The search spaces may be divided into a UE-specific search space and a common search space, as shown in Table 4. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The search space may be decided by the following equation 3.

$$L \cdot \{(Y_k+m') \bmod [N_{CCE,k}/L]\}+i \quad \text{[Equation 3]}$$

In Equation 3, L is an aggregation level, $Y_k$ is a variable decided by RNTI and subframe number (k), m' is the number of PDCCH candidates. If carrier aggregation (CA) is used, m' is denoted by $m'=m+M^{(L)} \cdot n_{CI}$. If CA is not used, m' is denoted by m'=m, where m=0, . . . , $M^{(L)}-1$. $M^{(L)}$ is the number of PDCCH candidates. $N_{CCE,k}$ is a total number of CCEs of a control region at the k-th subframe. i is an index for determination of a separate CCE in each PDCCH candidate in the PDCCH and satisfies i=0, . . . , L−1. In a common search space, $Y_k$ is always set to zero '0'.

Figure 10:
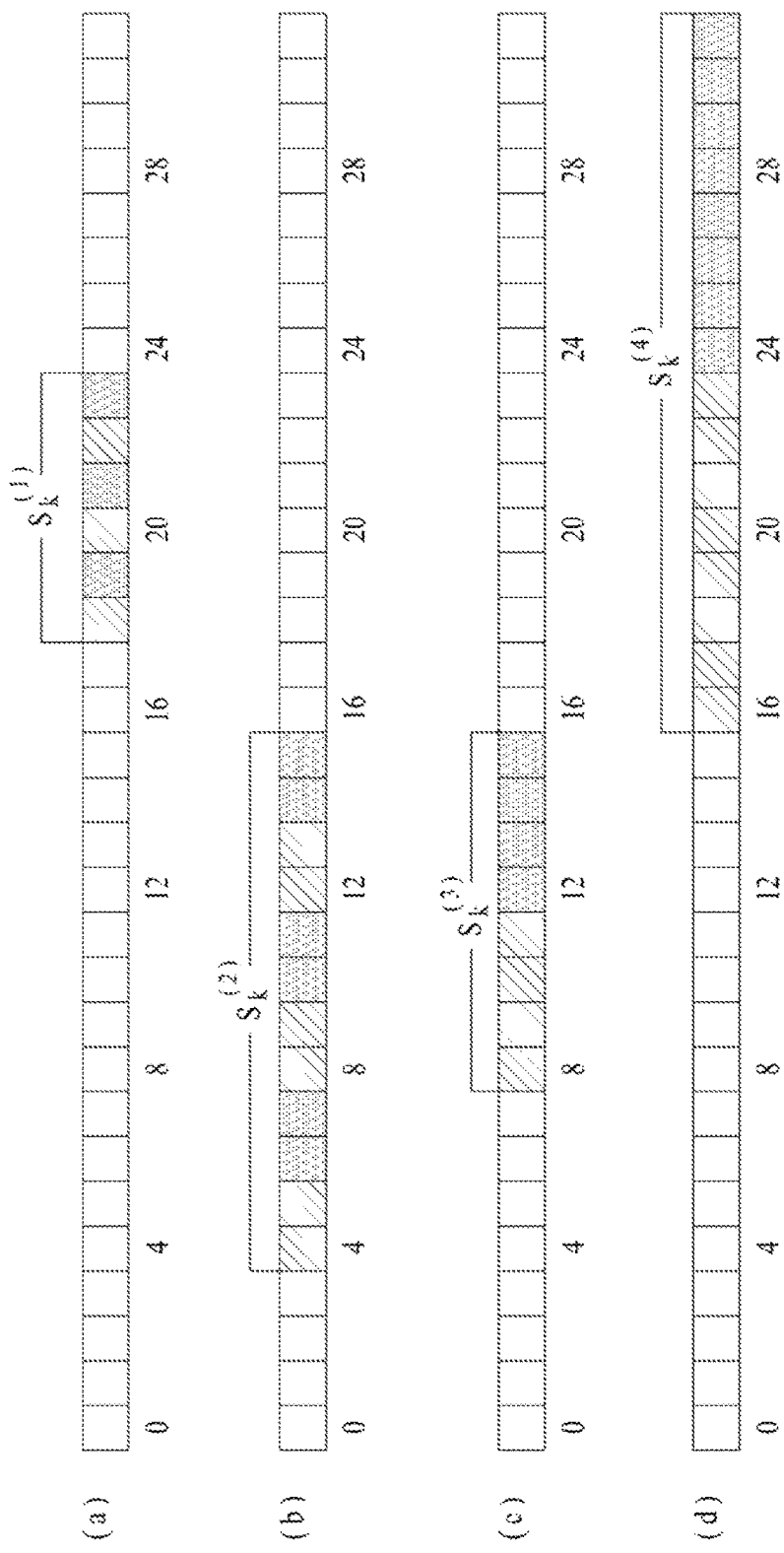
FIG. 10 is a conceptual diagram illustrating a search space at each aggregation level.

FIG. 10 is a conceptual diagram illustrating a UE-specific search space (shaded part) in each aggregation level defined by Equation 3. In FIG. 10, it should be noted that carrier aggregation (CA) is not used and the number of $N_{CCE,k}$ is exemplarily set to 32.

FIGS. 10(a), 10(b), 10(c), and 10(d) show a case of an aggregation level '1', a case of an aggregation level '2', a case of an aggregation level '4', and a case of an aggregation level '8', respectively. In FIG. 10, a start CCE of a search space in each aggregation level is determined to be an RNTI and subframe number (k), and may have different values according to individual aggregation levels due to a modulo function and an aggregation level (L) within the same subframe for one UE. The start CCE may always be set only to a multiple of an aggregation level due to the aggregation level (L). In this case, it is premised that $Y_k$ is set to, for example, a CCE number #18. The UE attempts to sequentially perform decoding from the beginning of a start CCE in units of CCEs decided by the corresponding aggregation level. For example, as can be seen from FIG. 10(b), the UE attempts to perform decoding on the basis of two CCEs according to an aggregation level from the beginning of a CCE number #4 acting as a start CCE.

The UE attempts to decode a search space, as described above. The number of decoding attempts is determined by DCI format and transmission mode determined through RRC signaling. When carrier aggregation (CA) is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation (CA) is not applied.

On the other hand, if carrier aggregation (CA) is used, as many UE-specific search space as the number of DL resources (component carriers: CCs) and a decoding process for DCI format 4 are further added, such that a maximum number of decoding times can be increased more and more.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for a BS (eNB) or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE (i.e., to geolocate a UE).

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in situations such as handover. The latter is an RS that a BS (eNB) transmits along with downlink data in specific resources. A UE can demodulate the data by measuring a channel using the RS. This RS should be transmitted in a data transmission area.

CRSs serve two purposes, namely, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the BS (eNB) has two Tx antennas, CRSs for antenna ports 0 and 1 are transmitted. In the case of four Tx antennas, CRSs for antenna ports 0 to 3 are respectively transmitted.

Figure 11:
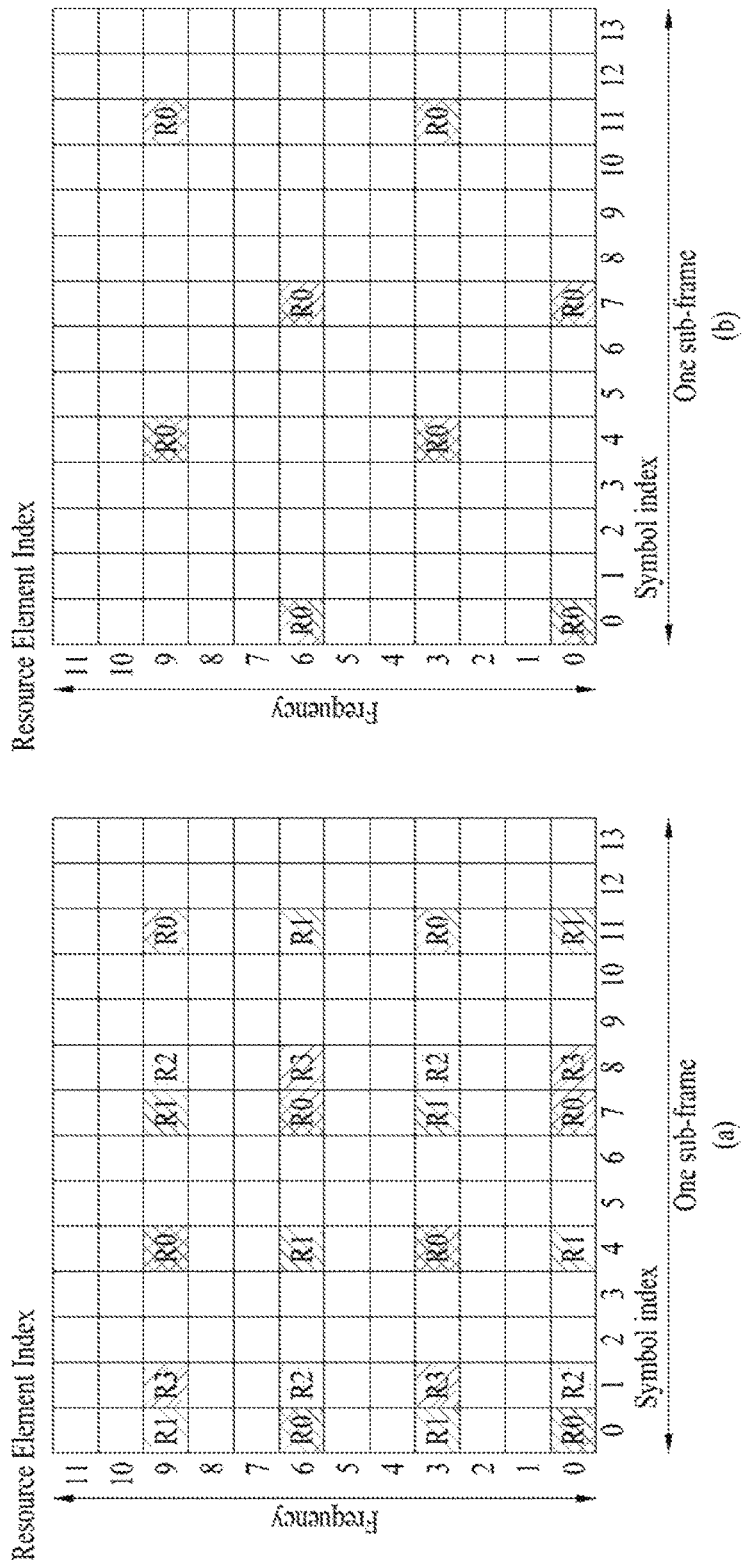
FIG. 11 is a conceptual diagram illustrating a cell-specific reference signal.

FIG. 11(a) shows a pattern within one RB for Antenna Port #0. FIG. 11(b) shows a CRS pattern within one RB when there are four Tx antennas of a BS or eNB.

Referring to FIGS. 11(a) and 11(b), when CRS is mapped to time-frequency resources, a reference signal (RS) for one antenna port on a frequency axis is mapped to one RE per 6 REs, and is then transmitted. One RB is composed of 12 REs on a frequency axis, such that 2 REs are used per RB in case of an RE for one antenna port.

CSI-RS

MIMO schemes are classified into an open-loop MIMO scheme and a closed-loop MIMO scheme. The open-loop MIMO scheme means that a transmitter performs MIMO transmission without receiving CSI feedback information from a MIMO receiver. The closed-loop MIMO scheme means that a transmitter receives CSI feedback information from the MIMO receiver and performs MIMO transmission. In accordance with the closed-loop MIMO scheme, each of a transmitter and a receiver can perform beamforming on the basis of CSI so as to obtain a multiplexing gain of a MIMO transmission antenna. The transmitter (for example, BS) can allocate an uplink control channel or an uplink shared channel to a receiver (for example, a user equipment) in such a manner that the receiver can feed back the CSI.

The feedback CSI may include a rank indicator (RI), a precoding matrix index (PMI), and a channel quality indicator (CQI).

RI is information on a channel rank. The channel rank means a maximum number of layers (or streams) via which different information can be transmitted through the same time-frequency resources. Since a rank value is determined depending on long-term fading of a channel, the rank value is generally fed back for a longer period than PMI and CQI. That is, the rank value can be fed back less frequently than PMI and CQI.

PMI is information regarding a precoding matrix used for data transmission from the transmitter, and includes spatial characteristics of a channel. Precoding means that a transmit layer is mapped to a transmit antenna, and the layer-antenna mapping relationship can be determined by precoding matrices. PMI corresponds to a UE-preferred precoding matrix index of a BS on the basis of metric data such as Signal-to-Interference plus Noise Ratio (SINR). In order to reduce feedback overhead of the precoding information, a transmitter and a receiver may share a variety of precoding matrices in advance, and only indices indicating a specific precoding matrix from among the corresponding codebook can be fed back.

CQI is information indicating channel quality or channel strength. CQI may be represented by a combination of predetermined MCSs. That is, a feedback CQI index may indicate a modulation scheme and a code rate. Generally, a reception SINR capable of being obtained when the BS constructs a spatial channel using a PMI is applied to CQI.

PSS (Primary Synchronous Signal)/SSS (Secondary Synchronous Signal)

Figure 12:
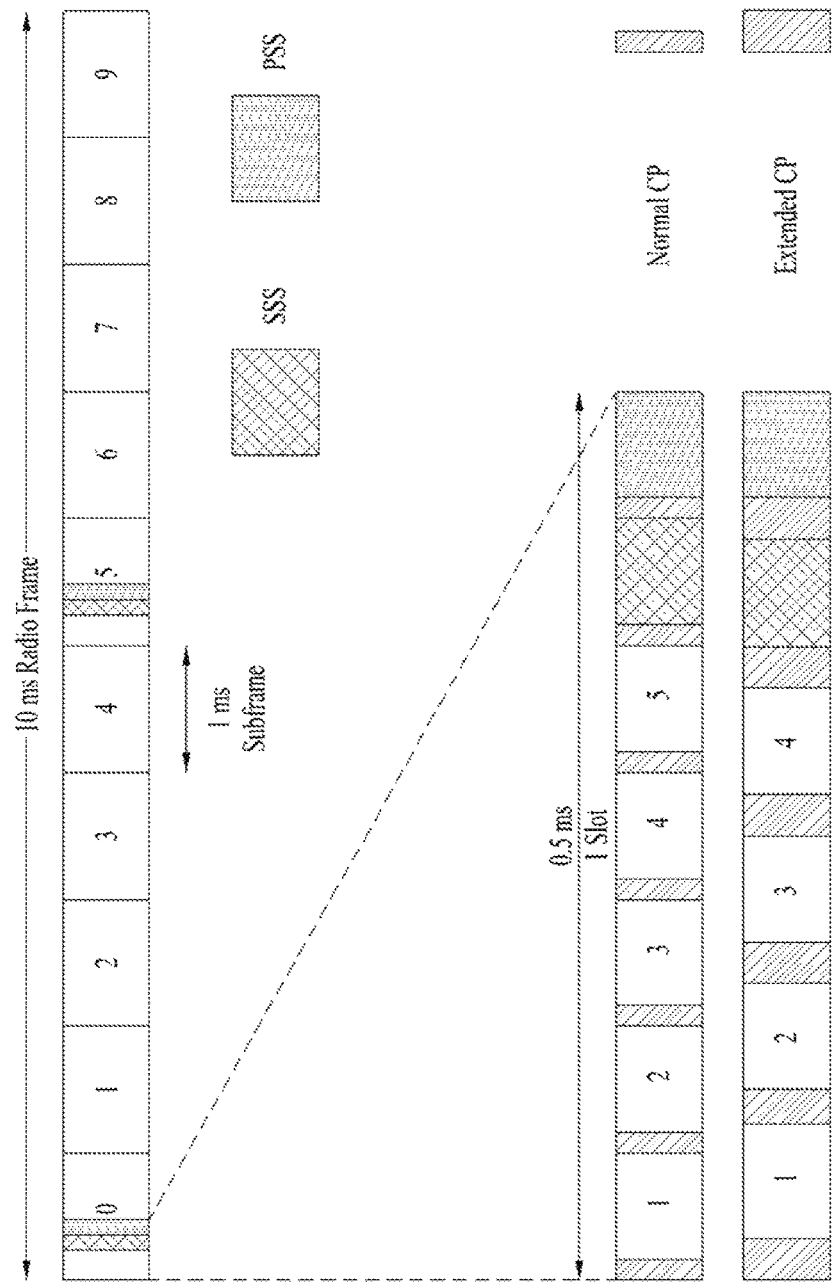
FIG. 12 is a conceptual diagram illustrating a synchronous signal for use in cell search.

FIG. 12 is a conceptual diagram illustrating PSS and SSS acting as synchronous signals used in cell search in LTE/LTE-A system. Prior to describing PSS and SSS, the cell search will hereinafter be described. In more detail, if a UE initially connects to a cell, the cell search is carried out to perform handover from a current connection cell to another cell or to perform cell reselection. The cell search may be achieved by frequency and symbol synchronization acquisition of the cell, downlink frame synchronous acquisition of the cell, and cell-ID decision. Three cell IDs may construct one cell group, and 168 cell groups may be present.

For cell search, the BS (or eNB) transmits PSS and SSS. The UE can detect the PSS so as to acquire 5 ms timing of the cell, and can recognize the cell ID contained in the cell group. In addition, the UE detects the SSS so that the UE can recognize radio frame timing and a cell group.

Referring to FIG. 12, PSS is transmitted at subframes #0 and #5. More particularly, the PSS is transmitted to the last OFDM symbol of a first slot at subframes #0 and #5. In addition, SSS is transmitted from a second OFDM symbol of the last end of the first slot of the subframes #0 and #5. That is, SSS is transmitted from an OFDM symbol just before PSS transmission. This transmission time relates to the case of FDD.

In case of TDD (not shown), PSS is transmitted at a third symbol (i.e., DwPTS) of subframes #1 and #6. SSS is transmitted at the last symbol of subframes #0 and #5. That is, in TDD, SSS is transmitted earlier than PSS by three symbols.

PSS is a Zadoff-Chu sequence having the length of 63. In actual transmission, zero '0' is padded to both ends of a sequence, and the sequence is transmitted to 73 subcarriers (72 subcarriers other than DC subcarriers, i.e., 6RBs) of the center part of the system frequency bandwidth. SSS is composed of 62 sequences having the length of 62 formed when two sequences each having the length of 31 are frequency-interleaved. In the same manner as in PSS, SSS is transmitted on 72 subcarriers located at the center part of the entire system bandwidth.

Physical Broadcast Channel (PBCH)

Figure 13:
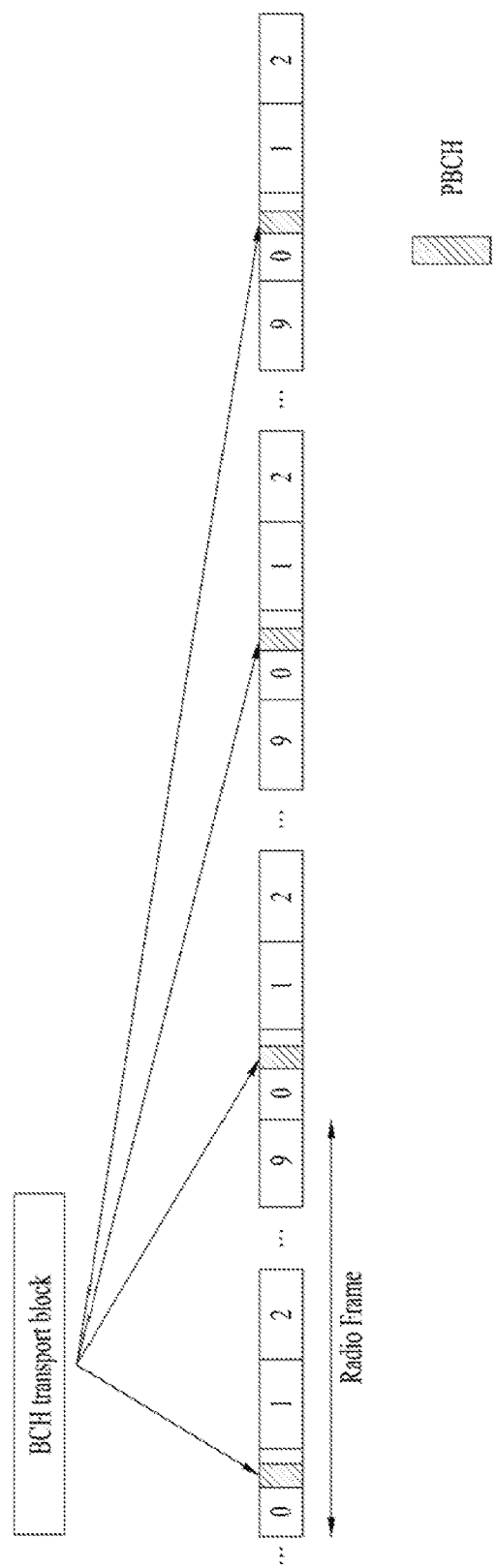
FIG. 13 is a conceptual diagram illustrating a physical broadcast channel (PBCH).

FIG. 13 is a conceptual diagram illustrating a PBCH. PBCH is used for transmission of a master information block (MIB). By means of the PBCH, a user equipment (UE) acquires synchronization through the above described PSS/SSS, obtains a cell ID, and obtains the next system information. In this case, MIB may include DL cell bandwidth information, PHICH configuration information, a system frame number (SFN), etc.

Referring to FIG. 13, one BCH transport block (TB) is transmitted through a first subframe from among four continuous radio frames. In more detail, BCH is transmitted at first four OFDM symbols of a second slot of Subframe #0 in the four contiguous radio frames, and is transmitted on the center 72 subcarriers of the entire bandwidth on a frequency axis. This means 6RBs indicating the smallest DL bandwidth. Although the UE does not recognize the size of a total system bandwidth, the UE can decode the BCH without any problems.

Figure 14:
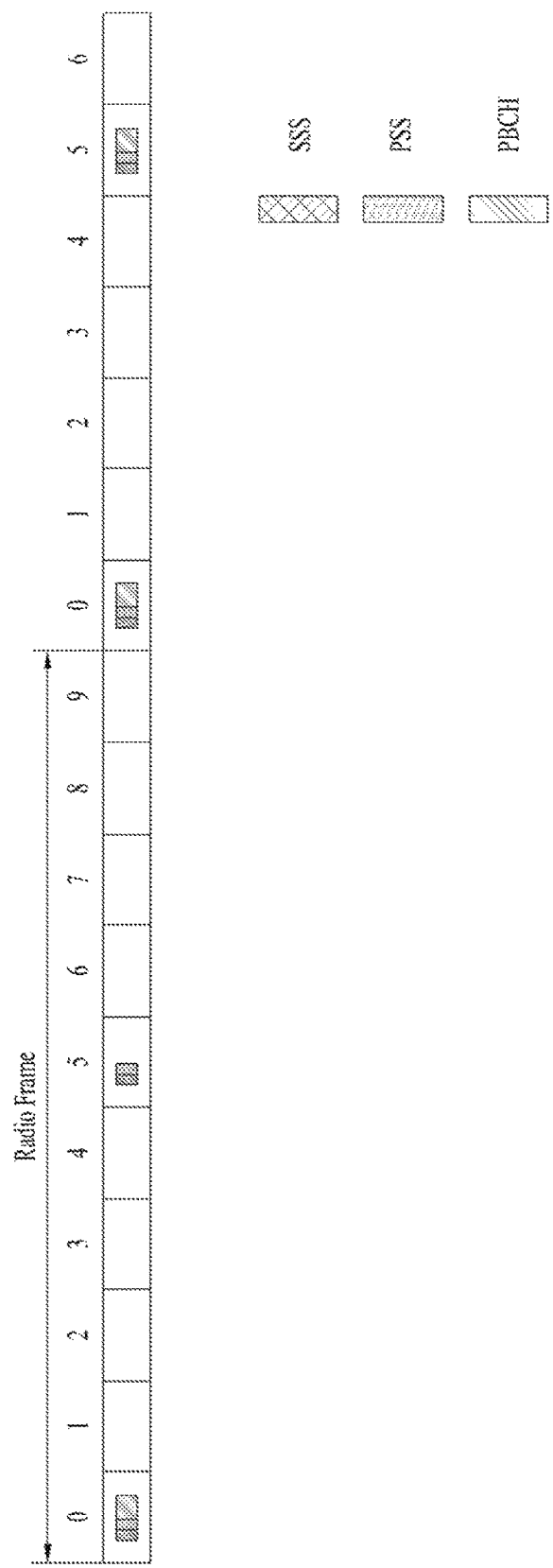
FIG. 14 shows transmit (Tx) time points of a synchronous signal and a PBCH.

The above-mentioned PSS/SSS and PBCH transmission time points for use in FDD will hereinafter be described with reference to FIG. 14. Referring to FIG. 14, in each radio frame, SSS and PSS are transmitted at the last two OFDM symbols of a first slot of a subframe #0, and PBCH is then transmitted at initial four OFDM symbols of the second slot. In addition, SSS and PSS are respectively transmitted at the last two OFDM symbols of the first slot of a subframe #5. Since PDCCH is transmitted on a control region (initial one to four OFDM symbols of each subframe according to a cell bandwidth) indicated by PCFICH, PDCCH is separated from a resource region in which PSS/SSS and PBCH are transmitted. In addition, PDCCH is not transmitted at a transmission position of CRS and CSI-RS. However, in case of e-PDCCH transmission, an unexpected collision may occur in the relationship between PSS/SSS and PBCH, resulting in the occurrence of problems.

e-PDCCH will hereinafter be described in detail. e-PDCCH indicates that PDCCH is transmitted from the legacy LTE/LTE-A system to a data region (i.e., a resource region for use in PUSCH transmission). e-PDCCH has been introduced due to the legacy PDCCH capacity limitation, interference between PDCCHs of the cells, and/or interference between PDCCH and PUSCH/PUCCH of the cells in carrier aggregation (CA), Coordinated Multi Point (COMP), Multi User Multiple Input Multiple Output (MU-MIMO), Machine Type Communication (MTC), Heterogeneous Network (HetNet), etc. e-PDCCH may be transmitted in a PDSCH region as described above, and may also be transmitted on the basis of a demodulation reference signal (DMRS). That is, when the UE decodes e-PDCCH, channel estimation may be used for DMRS. For this purpose, the BS or eNB may perform precoding of e-PDCCH and DMRS.

In other words, e-PDCCH may be transmitted in the PDSCH region. In this case, e-PDCCH may collide with a resource region to which basic information for the system, PS S/SSS, PBCH, RS, CSI-RS, etc. is transmitted.

Accordingly, according to the embodiments of the present invention, e-PDCCH cannot be allocated/transmitted to 6 RBs located at the center part (to which PSS, SSS, and/or PBCH are transmitted.) of the entire frequency band. From the viewpoint of a UE, it is expected that e-PDCCH is not transmitted, and e-PDCCH decoding/blind decoding is not performed in the corresponding region. In addition, if PSS, SSS, and PBCH are transmitted during e-PDCCH transmission, the embodiments of the present invention perform e-PDCCH puncturing at an RE where e-PDCCH overlaps with the above signals. In addition, if PSS, SSS, PBCH are transmitted during e-PDCCH transmission, the embodiments do not transmit e-PDCCH at the RE where e-PDCCH overlaps with the above signals, and perform rate matching.

Detailed embodiments of the present invention will hereinafter be described in detail. In the following description, if e-PDCCH is not allocated/transmitted to a specific region, it can be appreciated that the UE assumes/expects that e-PDCCH is not transmitted to a specific region and e-PDCCH decoding/blind decoding is performed in a resource region other than the specific region.

Embodiment 1

In a frequency domain (i.e., 6 RBs located at the center part of the entire frequency band) to which PSS/SSS and/or PBCH are transmitted in a subframe in which PSS/SSS and/or PBCH are transmitted, e-PDCCH may not be allocated/transmitted. In other words, in the subframe in which PSS/SSS and/or PBCH are transmitted, e-PDCCH may not be allocated/transmitted at a PRB pair to which PSS/SSS and/or PBCH are allocated. That is, the resource region to which e-PDCCH is allocated does not correspond to resources (PRB pair corresponding to 6 RBs located at the center part of the entire frequency band) used for transmission of synchronous signals (PSS/SSS) or PBCH.

The above-mentioned embodiment in case of FDD will hereinafter be described with reference to FIG. 15. FIG. 15(a) shows a subframe #5 to which PSS/SSS is transmitted, and FIG. 15(b) shows a subframe #0 to which PSS/SSS and PBCH are transmitted. In FIG. 15(a), e-PDCCH is not transmitted to a frequency region 1510 to which PSS/SSS is transmitted. In FIG. 15(b), e-PDCCH is not transmitted to a frequency domain 1520 to which PSS/SSS and/or PBCH are transmitted.

Although not shown in FIGS. 15(a) and 15(b), from the viewpoint of TDD, e-PDCCH may not be transmitted to a frequency domain (corresponding to 6 RBs located at the center part of the entire frequency band) to which PSS/SSS and/or PBCH are transmitted not only at Subframes #0 and #5 to which PSS is transmitted, but also at Subframes #1 and #6 to which SSS is transmitted.

Embodiment 2

PSS/SS is transmitted only to a first slot in case of FDD. e-PDCCH is not allocated/transmitted to a first slot in a subframe to which PSS/SSS is transmitted, and e-PDCCH can be allocated/transmitted to a second slot. In addition, e-PDCCH may not be allocated/transmitted to first and second slots in a subframe to which PSS/SSS and PBCH are transmitted. In more detail, e-PDCCH may not be allocated/transmitted to 6 RBs located at the center part of the first slot at Subframe #5 to which PSS/SSS is transmitted. e-PDCCH may not be allocated/transmitted to 6 RBs located at the center part of the first and second slots at Subframe #0 to which PSS/SSS and PBCH are transmitted, as shown in FIG. 16. It can be recognized that e-PDCCH is not allocated/transmitted not only to 6 RBs (1610) located at the center part of a first slot shown in FIG. 16(a) showing a subframe #5, but also to 6 RBs (1620) located at the center part of the first and second slots.

In brief, a resource region in which the UE performs decoding for e-PDCCH may be changed according to a combination of transmission and non-transmission of PSS, SSS and PBCH in a specific subframe. In other words, the UE does not transmit e-PDCCH to a resource region corresponding to 72 subcarriers (i.e., 6 RBs) located at the center part of the entire system bandwidth at Subframe #0 to which PSS, SSS and PBCH are transmitted. The UE estimates that e-PDCCH is not transmitted to a first slot at Subframe #5 to which PSS and SSS are transmitted, such that the UE can perform decoding at the subframe #5.

Alternatively, the UE estimates that e-PDCCH is not transmitted using OFDM symbols used for transmission of PSS, SSS and PBCH, and may perform decoding according to the estimated result. In more detail, the UE may estimate that e-PDCCH is not transmitted at the $6^{th}$ and $7^{th}$ OFDM symbols of the subframe #5 to which a synchronous signal is transmitted, and may also estimate that e-PDCCH is not transmitted at $6^{th}$ to $11^{th}$ OFDM symbols of the subframe #0 to which a synchronous signal and system information are transmitted.

In another example, the UE may estimate that e-PDCCH is not transmitted to a resource region to which PSS, SSS and/or PBCH are transmitted at the subframes #0 and #5, and may perform decoding in the resource region. That is, the UE may estimate that e-PDCCH is not transmitted not only to a resource region corresponding to 6 RBs located at the center part of the $6^{th}$ to $7^{th}$ OFDM symbols of the subframe #5, but also to a resource region corresponding to 6 RBs located at the center part of the $6^{th}$ to $11^{th}$ OFDM symbols of the subframe #0.

Embodiment 3

In case of TDD, since a synchronous signal can be transmitted at the first and second slots, e-PDCCH may not be allocated/transmitted to 6 RBs located at the center part of the frequency domain at OFDM symbols used for PSS/SS transmission. In addition, e-PDCCH may be transmitted to the remaining OFDM symbols other than OFDM symbols used for PSS/SSS transmission. In the subframe to which the synchronous signal and PBCH are transmitted, e-PDCCH may not be transmitted to 6 RBs located at the center part of the first and second slots as shown in the above-mentioned embodiment.

In more detail, for example, in the case of using the extended CP, the synchronous signal is transmitted not only at a third OFDM symbol of the first slot but also at a sixth OFDM symbol of the second slot, and PBCH may be transmitted to the first to fourth OFDM symbols of the second slot. In this case, e-PDCCH may be allocated through the remaining OFDM symbols other than OFDM symbols used for PSS/SSS transmission. In addition, e-PDCCH may not be transmitted to 6 RBs located at the center part of the subframe to which PSS, SSS, and PBCH are transmitted.

As can be seen from the above-mentioned description, REs used for transmission of RS or CSI-RS may be contained in the resource region in which the UE estimates non-transmission of e-PDCCH. For example, the above-mentioned embodiment has disclosed that the remaining region other than a specific region corresponding to 72 subcarriers located at the center part is used for e-PDCCH transmission, and decoding should be performed in the above remaining region. However, the scope or spirit of the present invention is not limited thereto, abd REs used for RS or CSI-RS transmission may be used as a UE-estimated region in which the UE estimates non-transmission of e-PDCCH.

In the meantime, the UE-estimated region in which the UE estimates non-transmission of e-PDCCH may be obtained when the BS or eNB performs puncturing or rate matching of REs belonging to the corresponding region.

Figure 17:
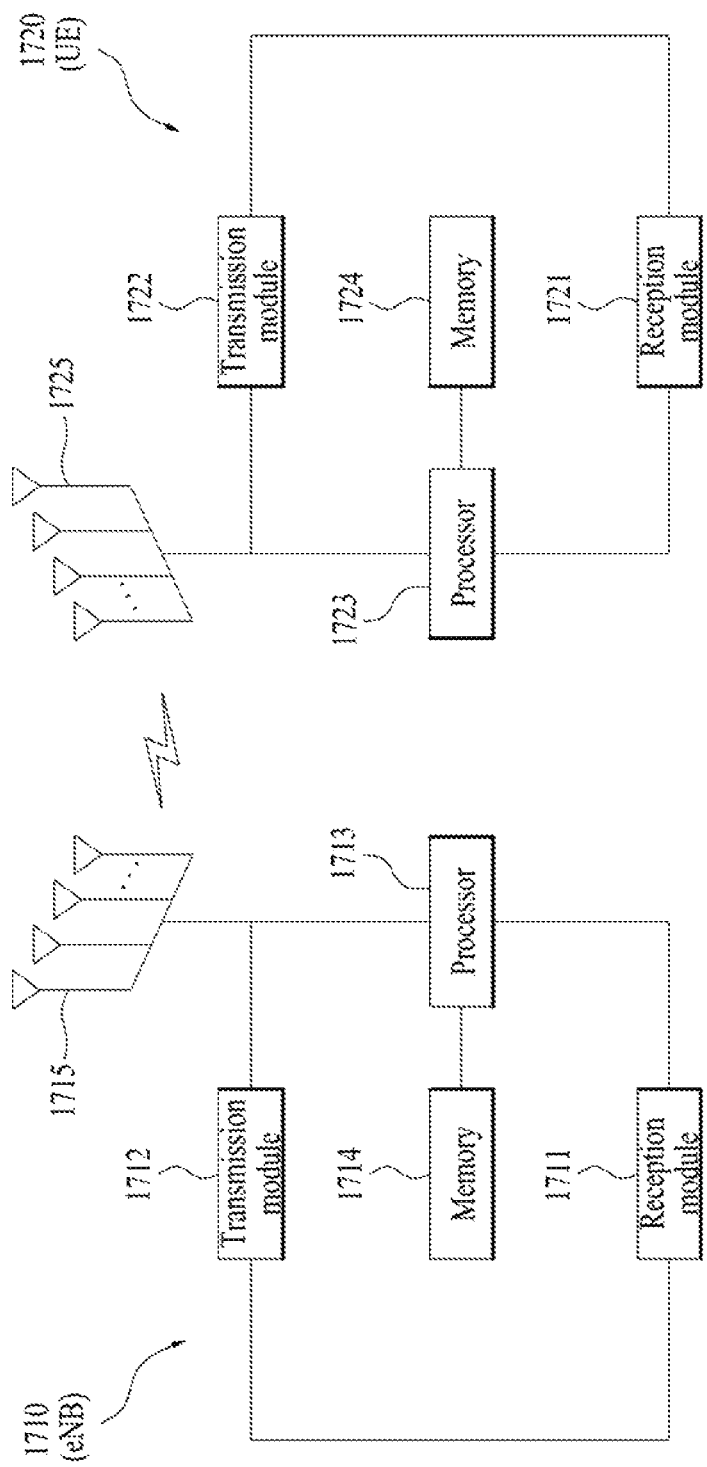
FIG. 17 is a block diagram illustrating a BS (or eNB) device and a UE device according to the embodiments.

FIG. 17 is a block diagram illustrating a BS (eNB) device and a UE device according to the embodiments of the present invention.

Referring to FIG. 17, the BS device 1710 according to the present invention may include a reception (Rx) module 1711, a transmission (Tx) module 1712, a processor 1713, a memory 1714, and a plurality of antennas 1715. The plurality of antennas 1715 indicates the BS device for supporting MIMO transmission and reception. The reception (Rx) module 1711 may receive a variety of signals, data and information on an uplink starting from the UE. The Tx module 1712 may transmit a variety of signals, data and information on a downlink for the UE. The processor 1713 may provide overall control to the transmission point apparatus 1710. The processor 1713 may be configured to implement the embodiments of the present invention.

The processor 1713 of the BS device 1710 processes information received at the BS device 1710 and transmission information to be transmitted externally. The memory 1714 may store the processed information for a predetermined time. The memory 1714 may be replaced with a component such as a buffer (not shown).

Referring to FIG. 17, the UE device 1720 may include an Rx module 1721, a Tx module 1722, a processor 1723, a memory 1724, and a plurality of antennas 1725. The plurality of antennas 1725 indicates a UE apparatus supporting MIMO transmission and reception. The Rx module 1721 may receive downlink signals, data and information from the BS (eNB). The Tx module 1722 may transmit uplink signals, data and information to the BS (eNB). The processor 1723 may provide overall control to the UE apparatus 1720. The processor 1723 may be configured to implement the embodiments of the present invention.

The processor 1723 of the UE apparatus 1720 processes information received at the UE device 1720 and transmission information to be transmitted externally. The memory 1724 may store the processed information for a predetermined time. The memory 1724 may be replaced with a component such as a buffer (not shown).

The specific configurations of the BS device and the UE device may be implemented such that the various embodiments of the present invention are performed independently or two or more embodiments of the present invention are performed simultaneously. Redundant matters will not be described herein for clarity.

The description of the BS device 1710 shown in FIG. 17 may be applied to the eNB (BS), or may also be applied to a relay node (RN) acting as a DL transmission entity or UL reception entity without departing from the scope or spirit of the present invention. In addition, the description of the UE apparatus 1720 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

Although the embodiments of the present invention have been disclosed on the basis of the 3GPP LTE mobile communication system, the embodiments can be equally or equivalently applied to various wireless communication systems.

The invention claimed is:

1. A method for receiving control information through an enhanced physical downlink control channel (EPDCCH), by a user equipment (UE) in a wireless communication system, the method comprising:
    performing blind decoding of a resource region comprising one or more EPDCCH candidates; and
    receiving control information through the one or more EPDCCH candidates,
    wherein the resource region is determined according to whether a primary synchronization signal (PSS), a secondary synchronization signal (SSS) or a physical broadcast channel (PBCH) is transmitted in a subframe,
    wherein when the PSS, the SSS, and the PBCH are all transmitted in the subframe, the resource region is determined as a first resource region excluding 6 resource blocks (RBs) from subframes that are located at a center part of a first slot and a second slot of the subframe, and
    wherein when the PSS and the SSS are transmitted in the subframe and the PBCH is not transmitted in the subframe, the resource region is determined as a second resource region excluding 6 RBs from the subframes that are located at a center part of the first slot of the subframe.

2. The method of claim 1, wherein a frequency domain on which either the PBCH, the PSS or the SSS is transmitted corresponds to 6 RBs located at a center part of an entire frequency bandwidth.

3. A method for transmitting control information through an enhanced physical downlink control channel (EPDCCH), by a base station (BS) in a wireless communication system, the method comprising:
    transmitting control information through a resource region comprising one or more EPDCCH candidates,
    wherein the resource region is determined according to whether a primary synchronization signal (PSS), a secondary synchronization signal (SSS) or a physical broadcast channel (PBCH) is transmitted in a subframe,
    wherein when the PSS, the SSS, and the PBCH are all transmitted in the subframe, the resource region is determined as a first resource region excluding 6 resource blocks (RBs) from subframes that are located at a center part of a first slot and a second slot of the subframe, and
    wherein when the PSS and the SSS are transmitted in the subframe and the PBCH is not transmitted in the subframe, the resource region is determined as a second resource region excluding 6 RBs from the subframes that are located at a center part of the first slot of the subframe.

4. The method of claim 3, wherein a frequency domain on which either the PBCH, the PSS or the SSS is transmitted corresponds to 6 RBs located at a center part of an entire frequency bandwidth.

5. A user equipment (UE) device operating in a wireless communication system, the UE comprising:
    a reception module configured to receive information; and
    a processor configured to:
    perform blind decoding of a resource region comprising one or more enhanced physical downlink control channel (EPDCCH) candidates; and
    control the reception module to receive control information through the one or more EPDCCH candidates,
    wherein the resource region is determined according to whether a primary synchronization signal (PSS), a secondary synchronization signal (SSS) or a physical broadcast channel (PBCH) is transmitted in a subframe,
    wherein when the PSS, the SSS, and the PBCH are all transmitted in the subframe, the resource region is determined as a first resource region excluding 6 resource blocks (RBs) from the subframes that are located at a center part of a first slot and a second slot of the subframe, and
    wherein when the PSS and the SSS are transmitted in the subframe and the PBCH is not transmitted in the subframe, the resource region is determined as a second resource region excluding 6 RBs from the subframes that are located at a center part of the first slot of the subframe.

6. The UE of claim 5, wherein a frequency domain on which either the PBCH, the PSS or the SSS is transmitted corresponds to 6 RBs located at a center part of an entire frequency bandwidth.

7. A base station (BS) operating in a wireless communication system, the BS comprising:
    a transmission module configured to transmit information; and
    a processor configured to control the transmission module to transmit control information through a resource region comprising one or more enhanced physical downlink control channel (EPDCCH) candidates,
    wherein the resource region is determined according to whether a primary synchronization signal (PSS), a secondary synchronization signal (SSS) or a physical broadcast channel (PBCH) is transmitted in a subframe,
    wherein when the PSS, the SSS, and the PBCH are all transmitted in the subframe, the resource region is determined as a first resource region excluding 6 resource blocks (RBs) from subframes that are located at a center part of a first slot and a second slot of the subframe, and
    wherein when the PSS and the SSS are transmitted in the subframe and the PBCH is not transmitted in the subframe, the resource region is determined as a second resource region excluding 6 RBs from the subframes that are located at a center part of the first slot of the subframe.

8. The BS of claim 7, wherein a frequency domain on which either the PBCH, the PSS or the SSS is transmitted corresponds to 6 RBs located at a center part of an entire frequency bandwidth.

* * * * *